United States Patent [19]

Kraft

[11] 4,012,234
[45] Mar. 15, 1977

[54] WATER ACTIVATION AND PRESSURE EQUALIZATION OF ELECTROCHEMICAL BATTERIES

[75] Inventor: Dennis W. Kraft, Thousand Oaks, Calif.

[73] Assignee: Bunker Ramo Corporation, Oak Brook, Ill.

[22] Filed: July 14, 1975

[21] Appl. No.: 595,586

[52] U.S. Cl. .................................. 429/48; 429/119
[51] Int. Cl.² .......................................... H01M 6/00
[58] Field of Search ........................... 136/112–114, 136/100 R, 100 M, 90

[56] References Cited

UNITED STATES PATENTS

| | | | |
|---|---|---|---|
| 3,423,245 | 1/1969 | Waller | 136/100 R X |
| 3,674,566 | 7/1972 | Powers | 136/114 |
| 3,853,630 | 12/1974 | Hausler | 136/114 |
| 3,859,136 | 1/1975 | Perry et al. | 136/113 X |
| 3,912,541 | 10/1975 | Britz | 136/114 X |

*Primary Examiner*—John H. Mack
*Assistant Examiner*—C. F. Lefevour
*Attorney, Agent, or Firm*—F. M. Arbuckle

[57] ABSTRACT

A battery pack is disclosed for an electrical device that is to be stored for an extended period until put into use in a body of water at some depth. The pack is comprised of fully charged batteries from which the electrolyte has been effectively removed for storing. Each battery is connected by a small tube to a reservoir containing an electrolyte-forming substance (which may be just water) or fully constituted electrolyte. Means on an inlet opens at a predetermined depth to admit water into the reservoir and force electrolyte (or just water in the case of battery plates being impregnated with electrolyte-forming substance) into the batteries. Each tube is also blocked by suitable means to hold electrolyte (or water) in the reservoir until its pressure exceeds a predetermined level. The battery pack is encased and the spaces between batteries are filled with inert pressure-equalization fluid so the outside of the batteries will be at the same pressure as the pressurized electrolyte.

15 Claims, 4 Drawing Figures

WATER ACTIVATION AND PRESSURE EQUALIZATION OF ELECTROCHEMICAL BATTERIES

BACKGROUND OF THE INVENTION

This invention relates to electrochemical storage battery systems for deep ocean applications, and more particularly to systems for automatically activating electrochemical storage batteries when dropped into an ocean with devices for use at some depth, and for preventing the batteries from crushing due to the high external pressure at great ocean depths.

Some electronic devices intended to be dropped or released for operation at great depths in the ocean, such as ocean rescue devices, undersea markers, emergency equipment and sonobuoys, must be stored at some naval dock, air facility or oil drilling platform for extended periods before use. The storage is normally at ambient temperatures and pressures. If the device is delivered by aircraft to the site where it is to be put into use, as will usually be the case for emergency equipment, the device may be subjected to very low (−40° C) temperatures during a high altitude flight. The device is then dropped into the ocean where it eventually comes to rest in an environment of low (0° C) temperature and high (several thousand psi) pressure.

Such electronic devices are intended to operate on self contained power supplied by electrochemical storage batteries. Due to the high pressures encountered at deep ocean levels, it is necessary to take some steps to prevent the batteries from crushing. That is usually done with a surrounding pressure vessel, or by using specially designed seawater batteries. In either case, the cost of the device is significantly increased by the steps taken to prevent the batteries from crushing. It would be desirable to use commercially available batteries with only inexpensive modifications for extended shelf life and for instant operation at pressures up to 10,000 psi.

SUMMARY OF THE INVENTION

In accordance with the present invention, a pack of electrochemical batteries is adapted to be stored for an extended period and then put into use in a body of water below some predetermined depth by removing all electrolyte from the batteries after they have been fully charged. The pack is provided with means for restoring the electrolyte in the batteries in response to water pressure at the selected depth. The electrolyte restoring means may be comprised of a reservoir filled with fully constituted electrolyte. Each battery is connected to the reservoir by a nonconductive tube having suitable means for blocking passage of electrolyte from the reservoir into the battery until pressure in the reservoir exceeds water pressure at the selected depth. The reservoir is provided with suitable means for transferring the pressure of the body of water to the electrolyte in the reservoir. Alternatively, the electrolyte restoring means may be comprised of a frangible vessel filled with concentrated electrolyte inside the reservoir. Water is admitted into the reservoir through suitable means. At some pressure depth below the selected pressure, the vessel breaks allowing concentrated electrolyte to be diluted by the admitted water. The reconstituted electrolyte is then forced into the batteries as before. Another alternative is to fill the frangible vessel with an electrolyte forming substance, such as a salt or a gell, which forms fully constituted electrolyte upon being mixed with water. Still another possibility is to fill the reservoir with just water, instead of fully constituted electrolyte, and to impregnate the battery plates with electrolyte forming substance. In each case, the battery pack is encased and spaces inside the encasement are filled with inert fluid to equalize pressure on the outside of the batteries with pressurized electrolyte inside. The compliance of the reservoir is preferably greater than of the walls of the batteries. The encasement may be a rigid canister with a compliant diaphragm on at least one end, or the equivalent in the form of a closed sock filled with inert fluid around the battery pack and an open ended rigid canister around the sock to protect it from tears in handling.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
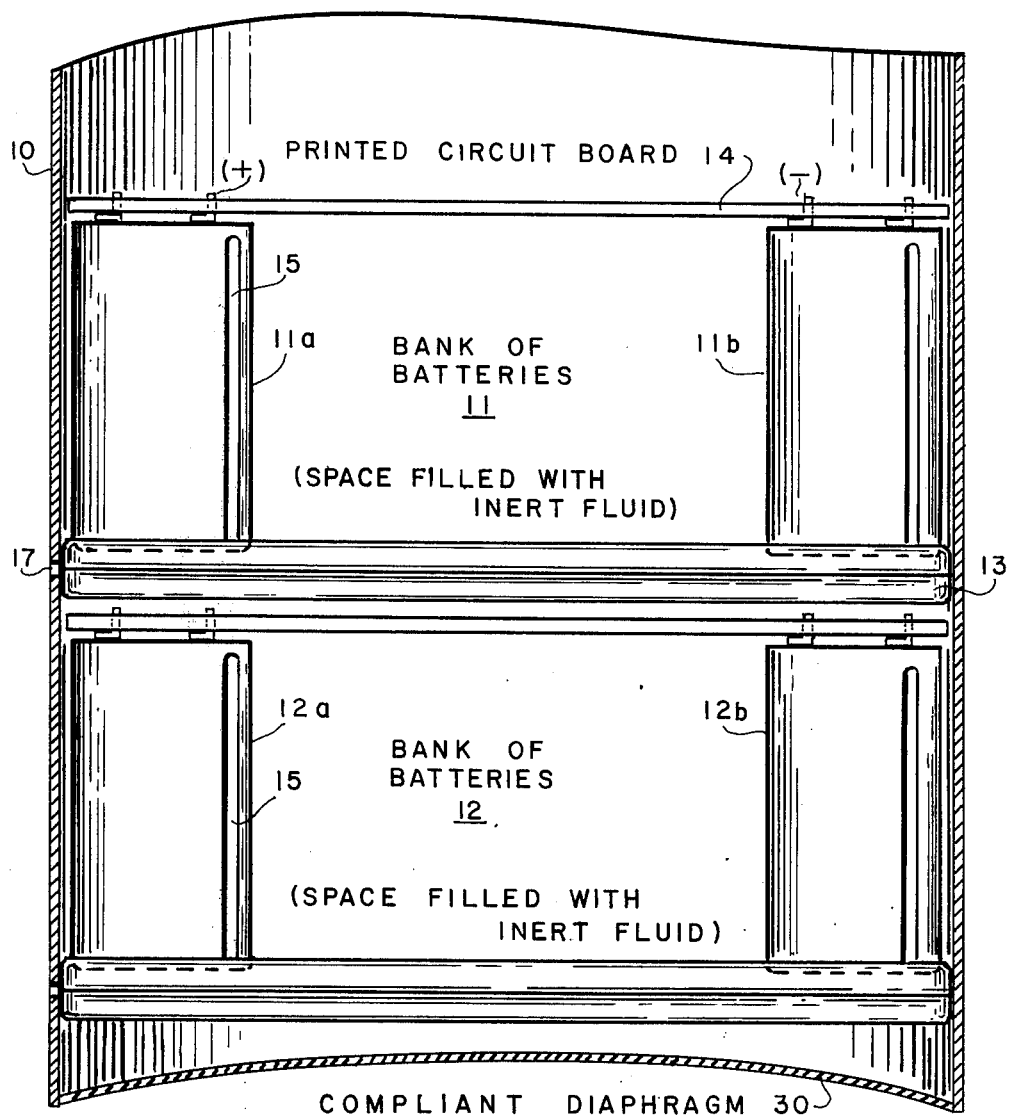
FIG. 1 is a view of a canister in cross section showing two banks of batteries mounted on reservoirs for electrolyte, or electrolyte forming substance.

At ordinary temperatures, charged storage batteries gradually discharge while not in use. This is a distinct disadvantage for devices that are to be stored for extended periods, and then expected to operate when suddenly put into use. This gradual discharge springs from the fundamental reaction which will proceed in the presence of the chemical reactants in the battery. For example, in a lead-acid battery, a "double sulfate" reaction will occur as follows:

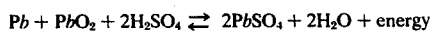

$$Pb + PbO_2 + 2H_2SO_4 \rightleftarrows 2PbSO_4 + 2H_2O + \text{energy}$$

The anode ($Pb$) and cathode ($PbO_2$) of the charged battery will react with the sulfuric acid to produce lead sulfate, water and electrical energy. The reaction will proceed at a rate generally proportional to the load. Under a "no load" condition, theoretically there should be no reaction as no electrical current flows through the electrodes, but in practice there is a gradual discharge such that after an extended period of about six months, the battery will be almost fully discharged. Removal of the sulfuric acid will stop this gradual reaction, even in the presence of water. Removal of all liquid further ensures dormancy of the battery. Consequently, the technique for preparing a charged battery for extended shelf life is to remove the electrolyte, and replace it when the battery is put into use.

This technique is not confined to lead-acid batteries; any battery from which the electrolyte can be removed can be stored in that manner, including so-called "dry-cell" batteries since they also depend upon an electrolyte for the reaction necessary to produce electrical energy. Therefore, although "wet-cell" batteries are referred to in this description of preferred embodiments, it should be understood that the term "batteries" includes all types, dry-cell batteries as well as wet-cell batteries commercially available among which are the following: Lead Acid, Nickel Cadmium, Silver Zinc, Silver Cadmium, Magnesium-Silver Chloride, Zinc-Air, and Ammonia-Magnesium. In each case, the electrolyte may be removed after the batteries have been charged. The electrolyte is then injected automatically when the battery is placed in service upon immersing the device to be powered by the batteries in water at some predetermined minimum depth.

Concerning electrolyte injection, the fully constituted or pre-prepared electrolyte can be stored in a reservoir within the device for injection, or an electrolyte-forming substance may be stored in the reservoir. The electrolyte is reconstituted in the reservoir by adding water to the forming substance before injection into the batteries. Alternatively, the electrolyte forming substance may be impregnated on the battery plates and thus stored in the batteries. Only water is then injected. In each case, a reactant is missing from the stored battery, and then added when the battery is placed in service, and the reactant is the electrolyte added by injecting the fully constituted electrolyte from a reservoir, injecting reconstituted electrolyte from the reservoir, or injecting just water to reconstitute the electrolyte in the battery cells.

Before proceeding with a description of the preferred embodiments illustrated in the drawings, the techniques of manufacturing batteries will first be presented. In manufacturing a lead acid battery, raw plates of pressed powders are "formed" by placing them in an electrolyte while charging and discharging. After forming is complete, the active plates can either be assembled into wet cells, or washed and dried for assembly into dry-charge cells. Alternatively, after pressing the plates, but before forming, the plates may be assembled into dry cells. Electrolyte is then added and forming is performed as the final step, leaving the batteries in a wet-charge state. The electrolyte can then be removed and the plates dried to leave the batteries in a dry-charge state. In either case, the plates should be washed after forming using a rinsing solution that is not harmful to the plates and miscible with acid. Water itself is the usual choice for the rinse.

Assuming a lead-acid battery, as the wet anode (lead) is drying, it will react with oxygen to form lead oxide ($PbO$) and lead dioxide ($PbO_2$) and heat. Lead is relatively inert; however, because of the porosity of the anode and resultant high surface area, this reaction does occur. In fact, fresh plates have been observed to get so hot they steam; according to the literature, plates have been known to take fire. Manufacturers have adopted various measures to counteract this tendency. These include drying in a vacuum or inert atmosphere of nitrogen or argon, or drying with superheated steam followed by rapid cooling. There is not a corresponding problem in the cathode since the cathode material (lead dioxide) is already in an oxidized state and is therefore essentially immune to this reaction.

Omission or removal of the electrolyte from a charged battery permits extended storage of the battery for as long as five years. Indefinite storage is not possible because even after the most careful washing, presumably some traces of acid remain which, in time, will tend to discharge the cell, and more likely there will be leakage of moisture into a perfectly dry battery.

Figure 2:
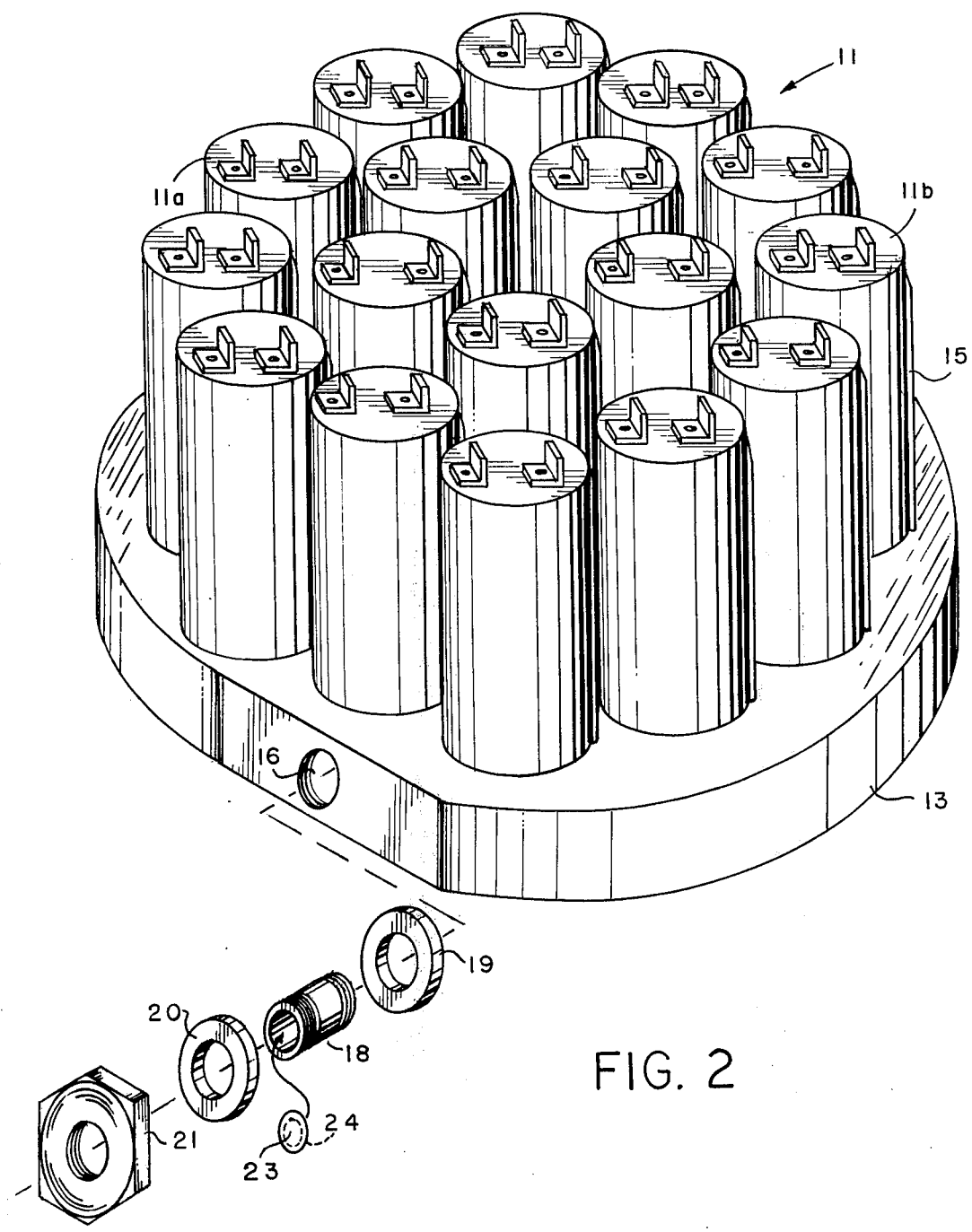
FIG. 2 is an isometric view of one of the banks of dry cell batteries mounted on a reservoir with an exploded view of parts for coupling a reservoir inlet with water outside the canister of FIG. 1 not shown in this figure.

Referring now to FIG. 1, a canister 10 of suitable plastic or metal, such as stainless steel or brass, is provided to contain banks of batteries 11 and 12 to power an electronic device, such as a sonobuoy (not shown), in an extension of the canister. Only two batteies are shown for each bank, namely batteries 11a and 11b for bank 11 and batteries 12a and 12b for bank 12. However, it is to be understood that as many as 22 D-size batteries may be supported in one bank with a canister of 7.5 inch diameter, as shown in FIG. 2, for the bank 11. The base of each battery in the bank is seated in a depression molded into a reservoir 13.

In an exemplary embodiment, each battery is a fully charged Lead-Acid battery modified by removing the electrolyte, either during manufacture or in a separate operation as described above. These dry-charged batteries are connected to the electronic device through printed circuit boards, such as a printed circuit board 14 (FIG. 1), and cables (not shown) extending along the inside wall of the canister. Positive and negative tabs (+ and −) connect the batteries to the printed circuit board. The device is not turned on until it is about to be dropped into the ocean, but even then the batteries do not power the device for lack of the electrolyte.

Figure 3:
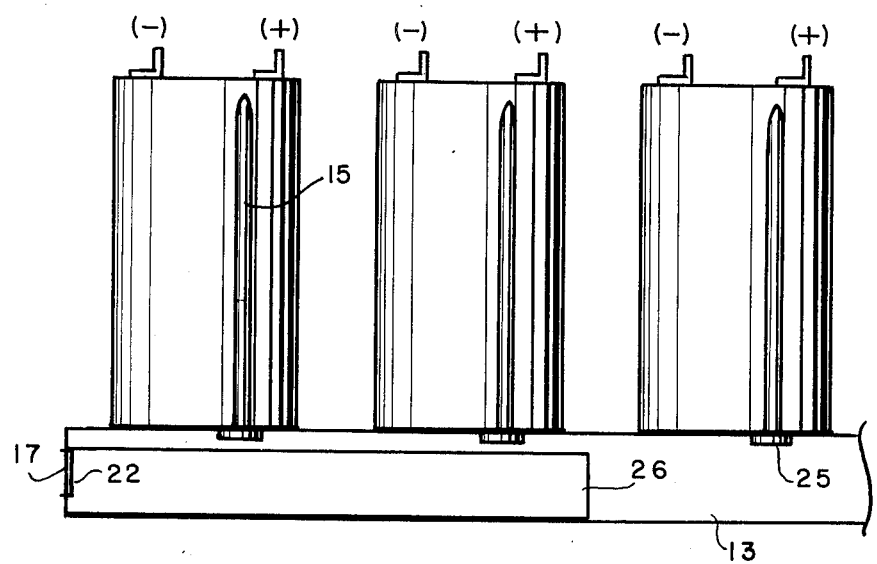
FIG. 3 is a schematic diagram of a portion of a bank of dry cell batteries mounted on a reservoir as before but implemented according to one embodiment of the present invention.

The electrolyte for each bank of batteries is stored in the supporting reservoir, such as the reservoir 13 for the bank 11. Each battery is connected to its supporting reservoir by a hollow non-conductive tube, such as tube 15 for the battery 11a. For Lead-Acid batteries, the electrolyte stored in the reservoir could be a fully constituted solution of sulfuric acid ready to be injected directly into the batteries, or an electrolyte-forming substance, such as concentrated sulfuric acid to be diluted with water in the reservoir prior to injection, or just water injected into the batteries for reconstituting electrolyte from substance impregnated into the battery plates. A frangible diaphragm in each tube isolates the reservoir from the battery, as will be more fully described hereinafter. When the canister is dropped into the ocean, it will sink to at least some predetermined level. As it sinks, the pressure on the canister increases, but the canister filled with an inert fluid, such as Dow-Corning 200 Silicon fluid, will not collapse. Each reservoir has a water inlet communicating with the ocean through a port in the canister, such as an inlet 16 shown in FIG. 2, communicating with the ocean through a port 17 (FIG. 1). A threaded sleeve 18 (FIG. 2) and rubber washer 19, seal the communication passage between the canister port and the reservoir inlet. The sleeve is threaded into the reservoir through the port 17 (FIG. 1) with the washer 19 over the sleeve before it is so inserted. A second washer 20 is then placed over the sleeve outside of the canister and a nut 21 is tightened over the washer 20. When a sufficient depth pressure has been reached, a frangible diaphragm 22 (shown schematically in FIG. 3) blocking the water inlet ruptures and ocean water enters the reservoir.

The diaphragm indicated schematically may take any one of a number of different forms that may occur to one skilled in the art, but it is preferably a sheet of elastic material 23 stretched over a ring 24 press fitted into the sleeve 18. When the sheet ruptures, water rushes in, but no part of the ruptured diaphragm is carried into the reservoir to block any of the tubes leading to the batteries. Alternatively, a plug of silicone grease may be used as the "diaphragm" in the sleeve. When the external pressure rises above a few psi, the ocean water forces the plug into the reservoir. A net inside the reservoir could be used to assure that the loose plug in the canister does not block any of the battery tubes. Still another alternative for the water inlet is a spring loaded one-way valve which opens into the reservoir when the external pressure exceeds the force of the spring. Frangible diaphragms 25 at the inlets of the battery tubes (shown schematically in FIG. 3) may also take any one of a number of different forms, such as a stretched membrane over the inlet, or a plug of silicone grease.

Assuming the reservoir is charged with concentrated sulfuric acid as an electrolyte forming substance, the ocean water mixing with acid forms a hot mixture that flows into the cells because the reaction of water and acid is exothermic. For example, the mixing of concentrated $H_2SO_4$ with water to form a 35% solution by weight produces a reaction that warms the solution about 40° C. The heat produced thus significantly warms the batteries. This produces enhanced performance over a cold battery.

The concentrated sulfuric acid would not, of course, fill all of the reservoir. Instead it fills only a polyethylene or thin glass vessel 26 in the reservoir. This vessel would be strong enough not to prematurely break in handling, but fragile enough to break at 50 to 100 psi pressure. As ocean water enters the vessel 26, and pressure mounts, the vessel breaks, releasing the concentrated acid as it continues to mix with water for a 36% acid mix. The frangible diaphragms 25 are designed not to break until an even higher pressure is reached, thus giving the mixture of water and acid time to stabilize. Plugs of silicone grease would inherently provide this delay due to the small diameter of the tubes and the distance the plugs must travel in the tubes. Every battery eventually becomes very nearly filled with fluid. Trapped air is harmlessly compressed in the batteries.

If the reservoir is charged with fully constituted electrolyte, it would fill the entire reservoir, and the vessel 26 would not be required. Instead a compliant diaphragm 27 (FIG. 4) would be provided to isolate the electrolyte from the incoming ocean water. Otherwise the electrolyte would be further diluted.

The vessel 26 could be charged with some other electrolyte forming substance as well, such as sodium sulfate ($Na_2SO_4$) salt or sodium hydrogen sulfate ($NaHSO_4$) salt. It could also be filled with an acid gell, such as an acid rich mixture of sulfuric acid immobilized in a boron-phosphate gell. Other possibilities are acidic anhydride, or sulfur trioxide ($SO_3$). The fully constituted electrolyte has the disadvantage of not yielding any heat to warm the batteries. The salts yield very little heat, but wuld need a smaller vessel 26. The table below summarizes important characteristics of these electrolyte forming substances for comparison with fully constituted (mixed) $H_2SO_4$ acid.

| Substance | Physical Form | Needed Volume Per D-size Battery | Temp. Rise Entire Cell |
|---|---|---|---|
| Mixed Acid | Liquid | 30 ML | None |
| Conc. Acid | Liquid | 7 ML | 42° C |
| Normal Acid Salts | Solid | 6.5 ML | 1.2° C |
| Hydrogen Salts | Solid | 6.5 ML | 3° C |
| Gelled Acid | Gell | 8–9 ML | ≃40° C |

In the case of the fully constituted electrolyte, the liquid capacity of the reservoir must exceed the empty volume of all the cells connected to it. In all cases some air will be trapped in the batteries as electrolyte fills them under pressure but that air is harmlessly compressed to a negligible volume. As the reservoir fills with ocean water under pressure, it will equalize the pressure on the outside of the batteries through the inert liquid surrounding the batteries. For that reason, the reservoir must be made to have higher compliance than the battery cases. However, the flat broad walls of the reservoir will inherently have greater compliance than the cylindrical walls of the battery cases. If in addition a more compliant material is selected for the reservoir, such as a 0.030 inch neoprene sheet across the bottom, there is no difficulty in meeting this requirement. If not met, there is possibility of the battery cases cracking and leaking electrolyte.

If the canister 10 is made of rigid material, or of very low compliance material, some other compliance should be provided to compensate for the compressibility of the inert pressure-equalization fluid around the batteries and reservoirs. That may be provided in the form of a flexible diaphragm 30 at the end of the canister. Alternatively, the entire pack (banks of batteries and reservoirs held together by rods) may be enclosed in a thin rubber sock. The socked pack would then be filled with inert pressure equalizing fluid and placed into a free-flooded canister. The sock would, of course, be sealed by a clamp.

The tubes 15 through which the batteries are filled from the reservoir must make a leakproof connection between the battery cases and the reservoir. Polypropylene is a suitable material for the tubes and it can be easily heat welded. Teflon tubes cemented with Dow Corning 140RTV silastic adhesive is a suitable alternative.

Figure 4:
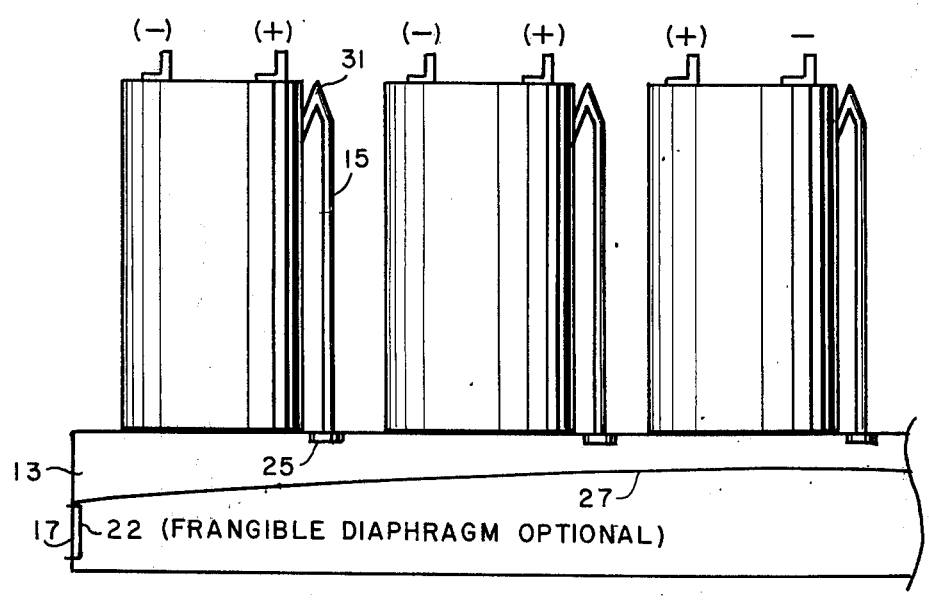
FIG. 4 is a schematic diagram of a portion of a bank of dry cell batteries mounted on a reservoir as before but implemented according to a second embodiment of the present invention.

During use, the tubes are filled with a conductive electrolyte. Therefore undesired discharge current paths exist from one battery to another through the individual tubes and the common reservoir. This current is minimized by maximizing the resistance of the individual tube current paths, as by making them as small and as long as possible, and by introducing a high-point bend 31 as shown in FIG. 4 to trap a bubble of air and any gas generated by the electrolysis of the battery in operation. A trapped bubble in the high-point bend will break the current path through the tube filled with electrolyte.

These and other modifications and equivalents may readily occur to those skilled in the art. Each may be important, and have its own advantages within the scope of the present invention. Consequently, it is intended that the claims be interpreted to cover such modifications and equivalents.

The embodiments of the invention in which an exclusive property or privilege is claimed are defined as follows:

1. A fully charged battery pack adapted to be stored for an extended period and then put into use in a body of water below some predetermined depth comprising:
   at least one electrochemical battery having positive and negative plates and an electrolyte for generating electricity, said battery having its electrolyte removed after the battery is fully charged;
   a reservoir having a water inlet admitting water into said reservoir, said reservoir containing a substance for restoring an electrolyte in said battery;
   means positioned within said water inlet for closing said inlet to prevent entry of water below a predetermined depth pressure, thereby admitting water under pressure through said water inlet into said reservoir when said battery pack is dropped into said body of water;
   a tube connecting said reservoir to said battery; and
   means associated with said tube responsive to pressure from said body of water for forcing said substance through said tube into said battery under depth pressure of said body of water.

2. The battery pack of claim 1 wherein said last named means includes a diaphragm in said reservoir only one side of which is in communication with said water inlet and all of said substance is on the other side of said diaphragm in communication with said tube, and wherein said substance is water, whereby said diaphragm is positioned to prevent mixing of said water substance with said water admitted through said water inlet.

3. The battery pack of claim 1 wherein said last named means includes a diaphragm in said reservoir only one side of which is in communication with said water inlet and all of said substance is on the other side of said diaphragm in communication with said tube, and wherein said substance is fully constituted electrolyte, whereby said diaphragm is positioned to prevent dilution of said electrolyte by said water admitted through said water inlet.

4. The battery pack of claim 1 wherein said last named means comprises a frangible vessel in said reservoir, said vessel being filled with an electrolyte-forming substance which, upon mixing with water admitted through said water inlet forms fully constituted electrolyte, said vessel being adapted to break from pressure exerted by said water admitted through said water inlet to permit mixing of said electrolyte-forming substance with said admitted water.

5. A battery pack as defined in claim 1 wherein said tube is made of nonconductive material and includes a gas trap, whereby a bubble of gas generated by said battery is trapped to break any electrical current path through electrolyte in said tube to said body of water through said water inlet.

6. The battery pack of claim 4 wherein said first named means comprises a frangible diaphragm and wherein said last named means includes means for blocking passage of said substance in said battery through said tube until pressure within said reservoir increases to at least said depth pressure due to water admitted through said inlet at said predetermined depth pressure.

7. A battery pack as defined in claim 5 wherein said encasement is comprised of a rigid canister and wherein the compliance of said reservoir is greater than of the walls of said batteries, whereby pressure in said reservoir is partially transferred from said reservoir through said inert fluid to the outside of said battery walls.

8. A battery pack as defined in claim 5 including means in said encasement for transferring water pressure from said body of water directly to said inert fluid.

9. A battery pack as defined in claim 6 wherein said electrolyte-forming substance is comprised of concentrated acid.

10. A battery pack as defined in claim 6 wherein said electrolyte forming substance is comprised of an acid-forming salt.

11. A battery pack as defined in claim 6 wherein said electrolyte-forming substance is comprised of an acid-forming gell.

12. A battery pack as defined in claim 6 including an encasement, and an inert fluid filling the space around said battery in said encasement to equalize the pressure on the outside of said battery as it is filled with said substance from said reservoir under pressure of said body of water.

13. A battery pack as defined in claim 8 wherein said reservoir is so made as to be more compliant than the walls of said batteries.

14. A battery pack in an encasement for providing power to an electrical device that is to be stored for an extended period until put into use in a body of water below some predetermined depth, comprising:
   fully charged batteries from which all of at least one necessary substance of the electrolyte has been effectively removed for storing;
   a reservoir storing a substance of the type removed for refilling said batteries to thereby refill said batteries with electrolyte, said reservoir having a water inlet admitting water into said reservoir;
   small tubes, each connecting a separate one of said batteries with said reservoir;
   means positioned within said water inlet for closing said inlet to prevent entry of water below a predetermined depth pressure, thereby admitting water under pressure through said inlet into said reservoir when said battery pack is dropped in said body;
   means in association with said tubes responsive to pressure from said body of water for forcing said substance through said tubes into said batteries;
   an inert fluid filling space around said batteries in said encasement to equalize the pressure on the outside of said batteries with pressure of electrolyte inside said batteries; and
   means for transferring pressure of said body of water to said inert fluid.

15. A battery pack as defined in claim 13 wherein each of said small tubes is made of nonconductive material and includes a gas trap, whereby a bubble of gas generated by any of said batteries is trapped to break any electrical current path through electrolyte in the corresponding ones of said tubes.

* * * * *